March 25, 1969    A. SEIFERT    3,434,432
CONVERTIBLE RAIL-HIGHWAY VEHICLE
Filed Jan. 9, 1968    Sheet 1 of 2

INVENTOR.
ARTHUR SEIFERT
BY

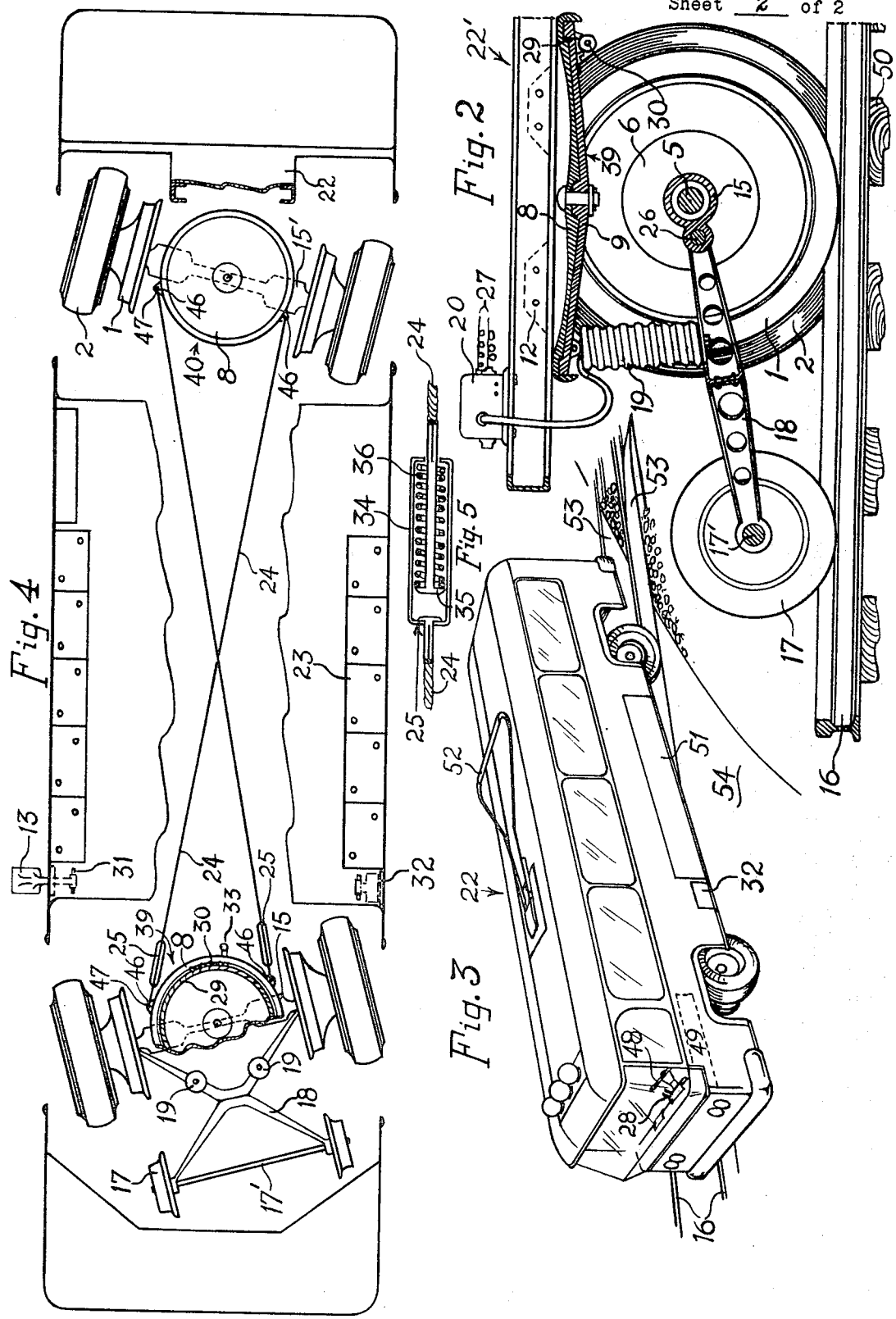

United States Patent Office 3,434,432
Patented Mar. 25, 1969

3,434,432
CONVERTIBLE RAIL-HIGHWAY VEHICLE
Arthur Seifert, P.O. Box 41, Soundview Station,
Bronx, N.Y. 10472
Filed Jan. 9, 1968, Ser. No. 696,538
Int. Cl. B61f 13/00, 1/06; B61d 15/00
U.S. Cl. 105—215                    8 Claims

ABSTRACT OF THE DISCLOSURE

The transportation system disclosed herein is based on a bus having four wheel steering which comprises two mounting units each constituted of an upper and lower dished disk and the lower disks of which are drivingly connected together, and having associated with the front drive unit thereof a pony guide wheel arrangement controlled by the operator of the bus.

---

This invention relates to urban and suburban transportation systems based upon the use of a vehicle designed for both rail and road operations.

Commuting into cities from suburban areas is one of the most important problems that now confronts society and the need for its solution becomes more critical day by day. As the present plans which have been promulgated involve the modernization of mass transit facilities that will take many years to complete and will require the expenditure of vast sums of money, it is vital that temporary measures for alleviating this problem be adopted as soon as possible.

It is the primary purpose of the instant invention to provide an intermediate and comparatively inexpensive interim solution to the problem. It will become apparent that this interim solution can also form a permanent part of any extended plan that is adapted for the eventual solution of mass transportation.

In accordance with the invention, there is provided a vehicle which can utilize the roads in certain local areas in the city and in the suburban districts to afford what may be termed "door-to-door" transportation for the riders thereof, and which can utilize rail lines connecting such areas to afford high speed transportation therebetween. When operating on rails the vehicle may utilize existing facilities. The vehicle is constructed so that it can change from roads to rails, and vice versa, without requiring the operator to stop or take any special precautions.

For a better understanding of the invention, as well as the advantages and features of novelty thereof, reference is made to the following detailed description which should be read in connection with the accompanying drawings, in which FIG. 1 is an elevational sectional view showing the front wheels of the vehicle mounted on the tracks of a rail line;

FIG. 2 is a side elevational view, partly in section, of the front wheels of the vehicle;

FIG. 3 is a perspective view of the vehicle and showing it transferring from the rail tracks to a roadway;

FIG. 4 is a top view, partly in section, of the undercarriage of the vehicle; and FIG. 5 is a sectional view of a spring unit associated with the steering mechanism of the vehicle.

Figure 1:
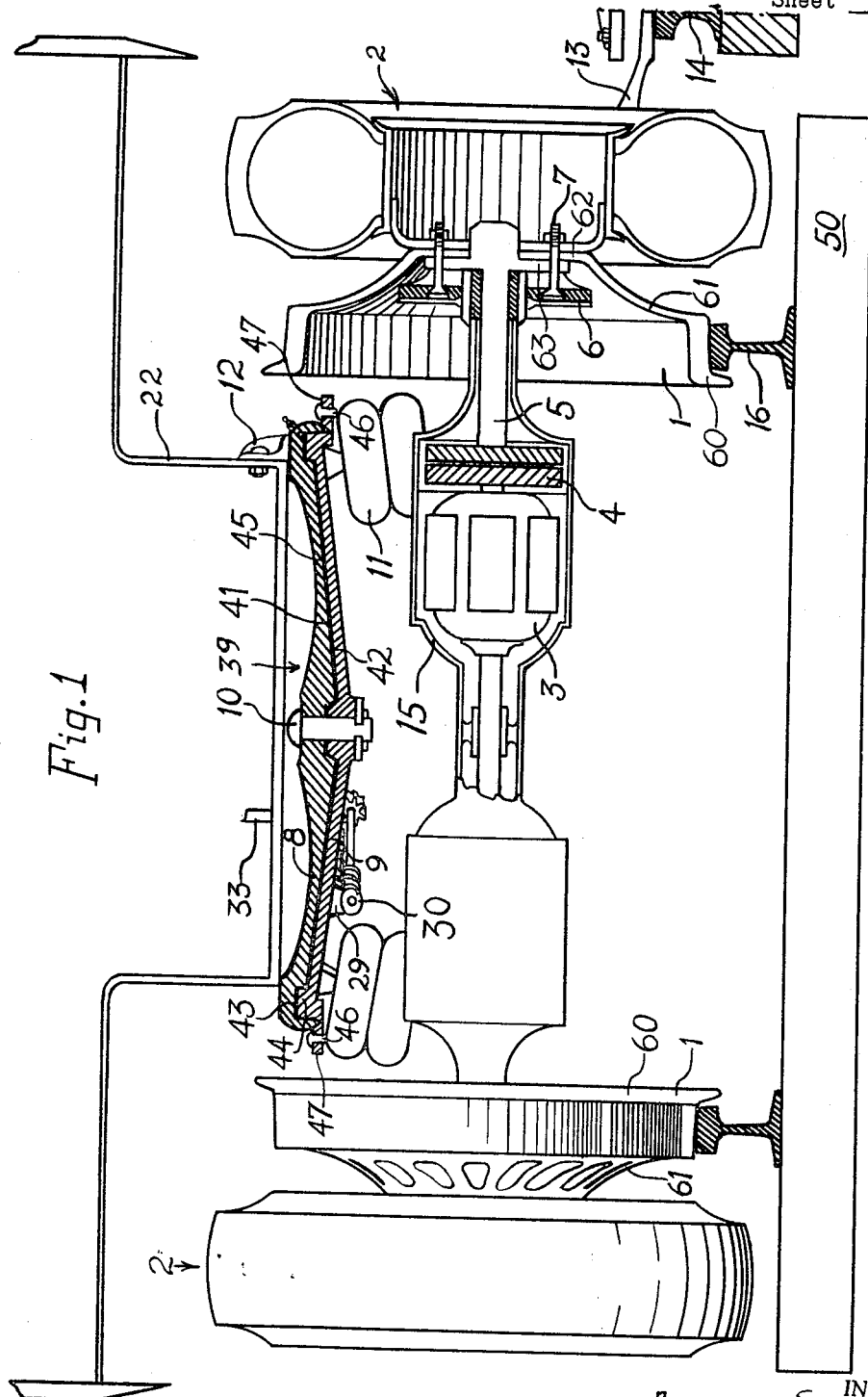

Before entering into a detailed description of the drawings, it might be pointed out generally that the system of this invention is primarily concerned with the problem of transportation between an urban area, such as the downtown area of a city, and a suburban district near such city. In accordance with the invention, a commuting bus will have a regular route through the local area or town in the suburban district and will then proceed to an access point on a rail line running from such district to the city. Preferably the bus will utilize old obsolete or surplus railroad rights-of-way so as not to interfere with active railroad traffic. The bus will proceed without stop from the suburban district to a master transfer point near or within the city. Here the passenger can transfer to other buses serving other areas than the particular downtown area for which his bus is headed. His bus then continues to the metropolitan area that it serves, going onto the streets in such area to discharge and pickup passengers on the most convenient route for the riders. The routing of the bus in the metropolitan area should be against rush hour traffic which may require the use of two alternate rail access points depending on whether the rush is in the morning or evening. After completing the city route the bus proceeds on the rail to its home destination.

As is shown in FIG. 3 of the drawings, the bus body 22 may be any contemporary type bus body which is best suited for the purposes of the system. The frame 22' of the bus is supported on the running units by a front mounting 39 and a rear mounting 40, each of which is composed of an upper disk-shaped member 8 fixedly secured to the frame 22' by any suitable means such as the brackets designated 12. Each disk member 8 is formed to provide a convexly-shaped lower bearing surface 41 adapted to rotatably seat on the upper concavely-shaped bearing surface 42 of a lower disk-shaped member 9. The periphery of disk member 8 is provided with an annular guide groove 43 in which is seated an annular rib or guide member 44. The two disks are coupled together by a coupling pin 10 enabling the disk 9 to rotate or turn relative to the disk 8. Located between the disks 8 and 9 is a layer 45 of lubricating grease which not only facilitates the relative turning movements of the disks, but provides the major binding force, namely suction, for holding the disks together, since the pin 10 and the guide members 43, 44 mainly serve as guides to control the turning movements of the two disks. As is shown more clearly in FIG. 1 of the drawings, the lower disks 9 of each mounting unit 39, 40 is connected by coupling devices 11 of any suitable construction to the front and rear drive unit housings 15, 15', respectively.

The two mounting units 39 and 40 are coupled together by cables 24, 24 connected at their ends to the lower disks 9 of such units by pins 46 rotatably mounted in brackets 47 secured to the lower disks 9 (note FIGS. 1 and 4). The two brackets 47 provided on each lower disk 9 may be diametrically opposed on such disk and in alignment with the longitudinal axis of the associated drive unit housing, but preferably such brackets are located slightly inwardly of such axis so that they are not quite diametrically disposed on the disk as is shown in FIG. 4 of the drawings. The two steering cables 24 are crossed between the units 39, 40 and are each provided with a shock absorber 25 to ease the strain on such cables and to prevent the cables whipping in the running of the bus. The shock absorbers 25 may be of any suitable known construction and may be composed as shown in FIG. 5 of a casing 34 to one end of which is connected a portion of the cable 24, and a piston 35 to which is connected the other portion of cable 24. The piston 35 is maintained in advanced position by a compression spring 36 strong enough to cushion the shocks and to maintain the cables 24 taut. The steering wheel 48 of the bus is connected to the front drive unit in a conventional manner by any suitable steering mechanism known to the art and indicated generally in FIG. 3 of the drawings by the numeral 49. As is shown in FIG. 1 of the drawings, such steering mechanism 49 may embody a ring gear 29 secured to the lower disk 9 of the front mounting 39 and a worm gear 30 drivenly connected to the steering wheel 48.

As is shown more clearly in FIGS. 1, 2 and 4 of the drawings, the front and rear drive units each comprise two wheel assemblies composed of a pneumatic tire and wheel 2 of usual construction and mounted in the customary manner on a wheel axle 5 driven through a fluid drive or other suitable torque converter transmission 4 by an electrical motor 3 contained in the housing 15. A rail wheel 1 provided with the usual rail flange 60 is also mounted on each axle 5. Each wheel 1 is made hollow for lightness and has an outwardly extending portion 61 terminating in an offset central wall portion 62 which abuts and is secured by lug bolts 7 to the inner side of the wheel 2. Thus, the rail wheel 1 and the tire wheel 2 of each pair thereof are mounted as a unit on the end of the axle 5 which is provided with a flange 63 to properly secure such unit thereto. Conventional brakes 6 are associated with the connected pairs of pneumatic and rail wheels, the brake 6 associated with each pair being contained within the rail wheel as shown. It will be noted that the dimensions of the pneumatic and rail wheels are such that when the rail wheels 1 are mounted on the rails 16, the pneumatic wheels 2 will be clear of the rail ties 50, while when the pneumatic wheels 2 are resting on the ground, the rail wheels 1 will not engage the latter. Thus, with the aid of simple ramp members 53 in FIG. 3 adjacent to the tracks 16 at the access and discharge points thereof, the bus may readily drive off the tracks and onto the roadway 54 and vice versa. When operating on the streets power is furnished the motors 3 by storage batteries contained in storage battery compartments 51 provided in the sides of the bus body. When operating on rail tracks provided with a third rail or overhead wires, the bus may be provided with the usual pantograph 52 in FIG. 3, or with an electric contact shoe 13 which can be lowered about shaft 31 by suitable means so as to be brought into contact with the third rail 14 as shown in FIG. 1, and raised onto the body of the bus behind a door 32 when not in use as shown in FIG. 3. The third rail or overhead power wire can also be utilized as a power source for charging the batteries in the bus while it is running on the rails 16.

Associated with the front drive unit are pony guide wheels 17 for aligning the front rail wheels 1 on the tracks 16 and for guiding the latter when passing on access ramp 53 which will cause the pneumatic tires riding thereover to lift the rail wheels off of the rails while traversing such ramp. The pony wheels rae mounted on a shaft 17' carried by the outer legs of an X-shaped frame member 18, the inner legs of the latter of which are pivotally connected by pivot pins 26 to housing 15 of the front drive unit to enable the pony wheels to accommodate themselves to irregularities in the track and to the passing of the bus over ramps, and to be lifted into inoperative position when the bus is traveling on the roads. Located between the X-member 18 and the lower disk 9 of the front mounting 39 are a pair of known pneumatic or hydraulically operated suspension and spring units 19 capable of holding the pony wheels in contact with the rails when their guiding action is required, and of lifting the pony wheels from the rails and maintaining them in a raised position when the bus is traveling on the road. The spring units are connected to and operated by a servo or vacuum pump 20 of known construction mounted on the frame 22' of the bus and connected by electric wiring 27 to an operator controlled switch 28 mounted on the dashboard of the bus.

It is believed it will be evident from the foregoing that the above described bus construction is ideally suited to the system proposed by this invention. Its construction enables it to make use of existing rail facilities and rights of way and it is fast and economical in operation. When operating in traffic its four wheel steering construction will provide for a shorter turning radius thereby aiding traffic flow, providing better traction and less wear on the tires and giving a safer ride because such construction will lower the breakaway or skid point of the bus. Because the bus can be charged while running under power, it will have a higher utilization period and by utilizing in the manner described in its routing operations it will have a long revenue producing period each day. The bus will be more economical to operate than ordinary trains and provide a more flexible schedule for commuters than the latter. Because of its high rate of travel between the areas linked by the system, the bus will tend to reduce the use of individually operated automobiles.

While I have hereinabove described and illustrated in the drawings, a preferred embodiment of my invention, it will be apparent to those skilled in the art that various changes may be made therein without departing from the spirit of the invention.

I claim:

1. In a system of the character described, a vehicle adapted to traverse a highway or a railway, and comprising front and rear driving units, steering mechanism controlled by the operator and connecting both of said driving units to enable four wheel steering of vehicle while on the highway, and guide means coupled to one of said driving units and cooperative with the rails of a railway to maintain both of said driving units through said steering mechanism in proper arrangement for running on such rails, and means controlled by the operator for moving said guide means onto cooperative engagement with the rails and for rendering such guide means inoperative when the vehicle is on the highway.

2. In a system as defined in claim 1, in which said steering mechanism comprises a mounting unit associated with each driving unit, each of said mounting units comprising an upper disk connected to the body frame of the vehicle and a lower disk connected to its associated driving unit, means rotatably connecting said disks together, and cable means connecting said lower disks together so that they move in unison but in opposite directions.

3. In a system as defined in claim 2, in which the lower surface of said upper disk in each mounting unit is convexly-shaped and in which the upper surfaces of said lower disks are concavely-shaped, and a layer of lubricating material disposed between said convex and concave surfaces of each mounting unit.

4. In a system as defined in claim 3, in which said means rotatably connecting said disks of each mounting unit together, comprises an axial member located centrally of said disks, and interengageable annularly-shaped guide means on the peripheries of said disks.

5. In a system as defined in claim 1, in which said guide means comprises a pair of pony wheels associated with said front driving unit and a frame pivotally mounted on said front driving unit and supporting said pony wheels, and in which said operator controlled means, comprises spring means connected to said frame and constructed and arranged to raise said frame to an inoperative position and to lower said wheels into contact with the rails and to maintain said wheels in resilient engagement with said rails, means for actuating said spring means, and means controlled by the operator for controlling said actuating means.

6. In a system as defined in claim 2, in which the opposed surfaces of said upper and lower disks in each mounting unit are curved and complementary, and means between such surfaces for facilitating the movements therebetween.

7. In a system as defined in claim 1, in which each of said driving units comprises a wheel axle having mounted on an outer end thereof a wheel unit constituted of a tire wheel and a rail wheel, said tire wheel having a central wall portion, and said rail wheel having a flanged rail tire, and a portion projetcing outwardly from said rail tire and having an outer central mounting face engaging the central wall portion of said tire wheel, and means securing said central mounting face and wall portion together.

8. In a system as defined in claim 7, in which said rail wheel is hollow and said central mounting face is provided on an outer central wall of said projecting portion thereof, and brake means for said wheel unit located within said rail wheel.

References Cited

UNITED STATES PATENTS

| | | | |
|---|---|---|---|
| 235,785 | 12/1880 | Krajewski | 105—168 |
| 1,308,409 | 7/1919 | Gelling | 105—168 |
| 1,446,784 | 2/1923 | Carter. | |
| 2,062,801 | 12/1936 | Talon. | |

ARTHUR L. LA POINT, *Primary Examiner.*

HOWARD BELTRAN, *Assistant Examiner.*

U.S. Cl. X.R.

105—168; 280—100, 442